United States Patent
Joyce, Jr. et al.

[15] 3,671,579

[45] June 20, 1972

[54] PROCESS FOR OXIDIZING A 1,1-BIS(ALKYLPHENYL) ALKANE

[72] Inventors: Thomas P. Joyce, Jr., Penn Hills Township; Ralph W. Lagally; Johann G. D. Schulz, both of Pittsburgh, all of Pa.

[73] Assignee: Gulf Research & Development Company, Pittsburgh, Pa.

[22] Filed: March 4, 1970

[21] Appl. No.: 16,598

[52] U.S. Cl. ................................................260/517
[51] Int. Cl. ..............................................C07c 65/20
[58] Field of Search..........................................260/517

[56] References Cited
UNITED STATES PATENTS 3,453,321  7/1969  McCracken et al. ..................260/517

FOREIGN PATENTS OR APPLICATIONS 713,812  8/1954  Great Britain..........................260/517

*Primary Examiner*—James A. Patten
*Attorney*—Meyer Neishloss, Deane E. Keith and Joseph J. Carducci

[57] ABSTRACT

A process for converting a 1,1-bis(alkylphenyl)alkane to the corresponding benzophenone polycarboxylic acid which involves passing the 1,1-bis(alkylphenyl)alkane and aqueous nitric acid downwardly through a reactor maintained under oxidation conditions.

8 Claims, No Drawings

PROCESS FOR OXIDIZING A 1,1-BIS(ALKYLPHENYL) ALKANE

This invention relates to a process for converting a 1,1-bis(alkylphenyl)alkane to the corresponding benzophenone polycarboxylic acid which involves continuously introducing said 1,1-bis(alkylphenyl-alkane and aqueous nitric acid into the upper portion of a reaction zone maintained under conditions of reaction to convert said 1,1-bis-(alkylphenyl)alkane to benzophenone polycarboxylic acid and continuously removing reaction product from a lower portion of said reaction zone.

The 1,1-bis(alkylphenyl)alkane that is employed herein can be defined as one wherein the alkyl substituent on the aromatic ring has from one to five carbon atoms, preferably from one to three carbon atoms, and the alkane bridge has from one to eight carbon atoms, preferably from one to four carbon atoms. Specific examples of such compounds are 1,1-bis(3,4-dimethylphenyl)ethane, bis(2-methyl-4-ethylphenyl)methane, 1,1-bis(3-ethyl-5-butylphenyl)butane, 1,1-bis-(3,4-dipentyl phenyl)hexane, 1,1-bis(2-methyl-3,4-diisopropylphenyl)-octane, 1,1-bis(2,3,5,6-tetramethylphenyl)ethane, 1,1-bis(methylphenyl)ethane, etc. The process defined herein is particularly effective in the oxidation of 1,1-bis(3,4-dimethylphenyl)ethane.

Aqueous nitric acid having a concentration of about 5 to about 70 percent, preferably from about 40 to about 70 percent, is used as the oxidizing agent. The amount of nitric acid used, determined as the molar ratio of 100 percent nitric acid relative to the 1,1-bis(alkylphenyl)alkane can be from about 8.0 to about 25.0 to 1.0, preferably with the range of about 8.0 to about 14.0 to 1.0.

The space velocity [volume of 1,1-bis(alkylphenyl)alkane per volume of reactor space per hour] can be varied over wide limits, but in order to obtain effective oxidation herein a space velocity of about 10.0 to about 0.01, preferably about 4.0 to about 0.1, is maintained. Temperatures of about 110° to about 350° C., preferably of about 150° to about 250° C., and pressures of about atmospheric pressure to about 1,000 pounds per square inch gauge, or even higher, preferably from about 200 to about 500 pounds per square inch gauge, can be used.

By the time the reaction mixture has arrived at the bottom of the reaction zone and product is removed therefrom, the alkane bridge has been converted to carbonyl and the alkyl substituents on the aromatic ring have been converted to carboxylic acid groups. The reaction product may also contain small amounts of benzophenone carboxylic acids wherein not all of the alkyl substituents will have been oxidized, non-acidic ketones and nitric acid of lower concentration than that present in the charge. Separation of desired benzophenone polycarboxylic acid can be effected in any manner, for example, by cooling the reaction product and thereafter filtering the same to remove precipitated benzophenone polycarboxylic acid therefrom.

It is critical that the reactants be introduced into the reactor at the top and product removed from its bottom rather than employing introduction of reactants at the bottom and removal of product from the top for several reasons. First, there is obtained a far greater yield of desired benzophenone polycarboxylic acid, and secondly, the product is easily removed from the reactor and separation of benzophenone polycarboxylic acid therefrom is easily and efficiently achieved. When the reactants are passed upwardly through the reactor plugging in the outlet lines quickly occurs and the reaction must be terminated. Recovery of desired benzophenone polycarboxylic acid from the resultant product is obviously difficult and in most cases virtually impossible.

The process defined herein can further be understood by the following.

EXAMPLE I

Over a 2-hour period 94 milliliters of 1,1-bis(3,4-dimethylphenyl)ethane and 365 milliliters of 70 percent aqueous nitric acid, in a volume ratio of approximately 1:4, were continuously passed downwardly through a 750 milliliter tubular pressure reactor maintained at a temperature of 170° C. and a pressure of 200 pounds per square inch gauge and product was removed continuously from the bottom thereof. The product was cooled to room temperature, while stirring, to precipitate benzophenone 3,4,3',4'-tetracarboxylic acid (BTA). The precipitate was washed with water and then dried, resulting in 72.5 grams of a pale yellow solid. Gas chromatographic analysis of the latter showed a 47.4 percent molar efficiency to BTA. No further attempt was made to recover additional BTA from the filtrate, which still contains substantial amounts of the BTA.

EXAMPLE II

Example I was repeated using 276 milliliters of 1,1-bis-(3,4-dimethylphenyl)ethane and 1,025 milliliters of 70 percent aqueous nitric acid (volume ratio still being 1:4) over a period of three hours while employing a 750 milliliter tubular pressure reactor. In this run there was obtained 236 grams of a pale yellow solid, which by gas chromatographic analysis showed a 45.7 molar efficiency to BTA.

Operation of the above, which was carried out in accordance with the process defined and claimed herein, is to be contrasted with the following wherein the diarylalkane and nitric acid were passed upwardly through a reactor.

EXAMPLE III

Over a 3-hour period 255 milliliters of 1,1-bis(3,4-dimethylphenyl)ethane and 1,110 milliliters of 70 percent aqueous nitric acid, in a volume ratio of approximately 1:4, were continuously passed upwardly through a 750 milliliter tubular pressure reactor maintained at a temperature of 170° C. and a pressure of 200 pounds per square inch gauge. Product was continuously removed from the top of the reaction zone, with samples being collected at 1-hour intervals. The first sample, consisting of an oily upper layer and a lower aqueous layer, was cooled to room temperature while stirring. There was recovered 56.7 grams of a dark yellow precipitate from the oily layer and the aqueous phase, which was found to consist of 77.8 per cent (44.1 grams) of BTA. The second sample also consisted of two layers but was heated to dissolve in the aqueous phase any BTA contained in the oily phase. By decantation the oily phase was separated from the sample and the aqueous phase was evaporated to dryness to produce 68.8 grams of a tan solid of which 75.4 percent (51.9 grams) was BTA. No analysis was made of the third sample. Assuming two-thirds of the 1,1-bis(3,4-dimethylphenyl)ethane was consumed in the preparation of the two samples that were analyzed the efficiency to BTA was 38.7 molar percent.

The advantages of operation in accordance with the procedure defined herein is obvious. In Example III wherein the diarylalkane and nitric acid were passed upwardly through the reactor, efficiency to BTA was only 38.7 and problems of operation and recovery of product were encountered because of under-oxidation. No oily layer was encountered in Examples I and II and efficiency to BTA was increased to 47.4 and 45.7 percent, respectively. Moreover, had the same attempt been made in Examples I and II to recover additional BTA from the aqueous phases as was done in the second sample of Example III, the yields of BTA in Examples I and II in comparison with that of Example III would have been even more impressive.

Obviously, many modifications and variations of the invention, as hereinabove set forth, can be made without departing from the spirit and scope thereof, and therefore only such limitations should be imposed as are indicated in the appended claims.

We claim:

1. A process for converting a 1,1-bis(alkylphenyl)alkane to corresponding benzophenone polycarboxylic acid which comprises passing said 1,1-bis(alkylphenyl)alkane at a space velocity of about 10.0 to about 0.01 and aqueous nitric acid into the upper part of a reaction zone maintained at a temperature of about 110° to about 350° C. and a pressure of about atmospheric to about 1,000 pounds per square inch gauge to convert said 1,1-bis(alkylphenyl)alkane to diarylketone polycarboxylic acid, wherein the molar ratio of nitric acid relative to said 1,1-bis(alkylphenyl)alkane in the charge is from about 8.0 to about 25.0 to 1.0, and continuously removing reaction product from a lower portion of said zone.

2. The process of claim 1 wherein said 1,1bis(alkylphenyl)alkane is 1,1-bis(3,4-dimethylphenyl)ethane.

3. The process of claim 1 wherein the space velocity of said 1,1-bis(alkylphenyl)alkane in said reaction zone is from about 4.0 to about 0.1.

4. The process of claim 1 wherein the reaction temperature is from about 150° to about 250° C. and the pressure is from about 200 to about 500 pounds per square inch gauge.

5. The process of claim 1 wherein the nitric acid has a concentration of about 5 to about 70 percent.

6. The process of claim 1 wherein the nitric acid has a concentration of about 40 to about 70 percent.

7. The process of claim 1 wherein the reaction product is cooled to precipitate diarylketone polycarboxylic acid thereof.

8. The process of claim 1 wherein the molar ratio of nitric acid relative to said 1,1-bis(alkylphenyl)-alkane in the charge is from about 8.0 to about 14.0 to 1.0.

* * * * *